Nov. 3, 1925.  1,560,266
H. S. LEVINTHAL
FILTER DEVICE
Filed March 13, 1922
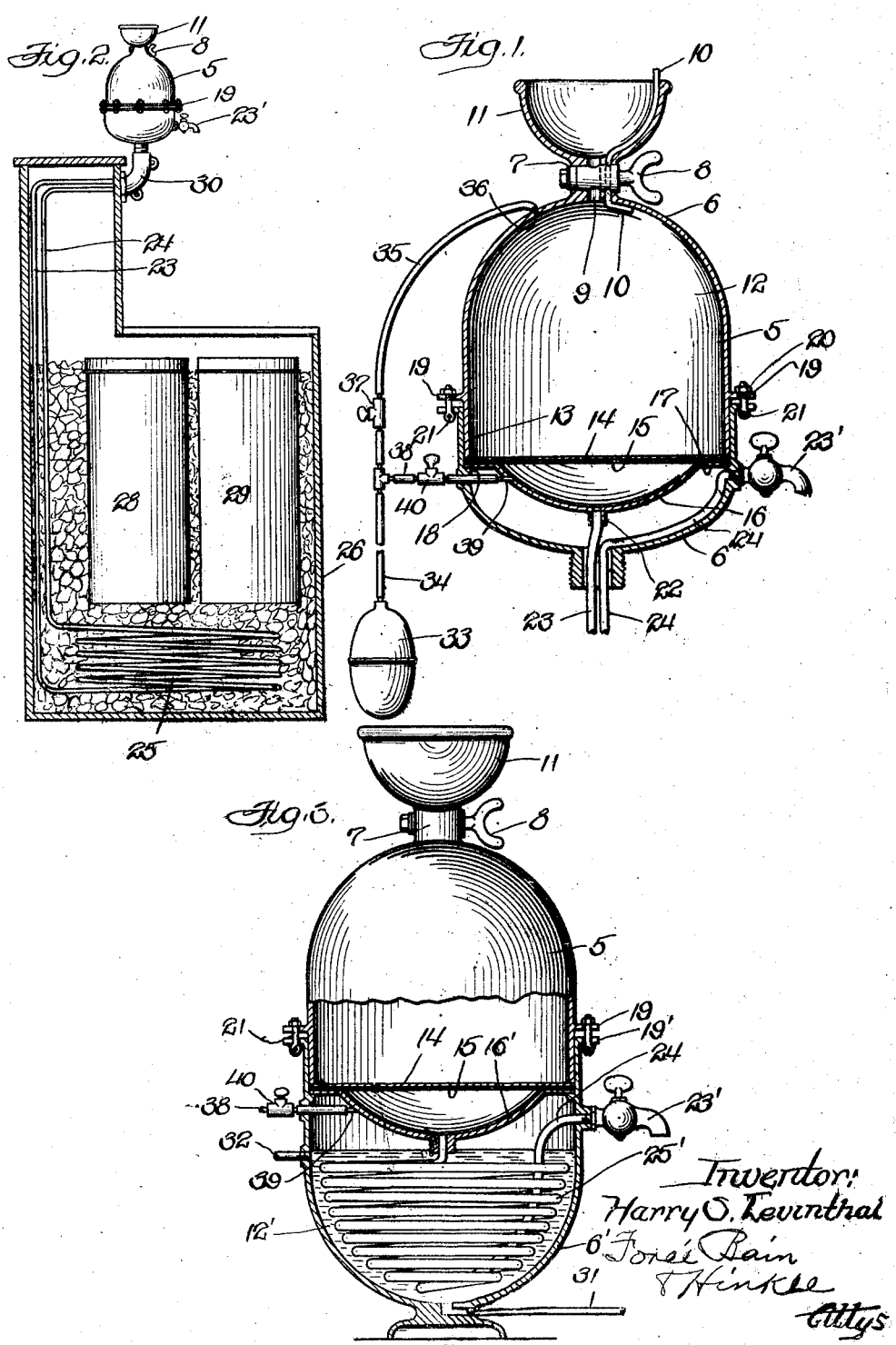
Inventor:
Harry S. Levinthal Patented Nov. 3, 1925.

1,560,266

UNITED STATES PATENT OFFICE.

HARRY S. LEVINTHAL, OF MELROSE PARK, ILLINOIS.

FILTER DEVICE.

Application filed March 13, 1922. Serial No. 543,313.

*To all whom it may concern:*

Be it known that I, HARRY S. LEVINTHAL, a citizen of the United States, residing at Melrose Park, in the county of Cook and State of Illinois, have invented certain new and useful Improvements in Filter Devices, of which the following is a specification.

The invention relates to filtering devices.

It will be explained in connection with its use in the preparation of beverages and pharmaceutical liquids, and the like, such as are dispensed in drug stores.

One of the objects of the invention is to provide a continuous filtering device in which the substance to be filtered may be subjected to regulable pneumatic pressure.

Another object is to provide means in connection with the filter, by which the filtered liquid may conveniently be cooled or heated to the desired temperature.

Another object is to provide a closable filter having means for producing air pressure above the liquid to be filtered therein and a coil to communicate with the discharge end of the filter and from which the filtered liquid may be entirely discharged by the air under pressure in the filter.

A further object is to provide a filter and means for producing air pressure whereby the direction of the fluid or liquid to be filtered through the filtering medium may be reversed to cleanse the medium of the accumulation of material particles.

A further object is to provide a filter providing a cylinder having a removable cap covering the lower or discharge end thereof and a tubular coil thru which filtered liquid may be passed, located in said cap, and another cap capable of being connected to the discharge end of the cylinder and used interchangeably with the first mentioned cap, whereby the filter may be economically used with or without the coil.

Another object is to provide a valve fitting structure whereby the filling opening and the air vent opening are simultaneously opened and closed by rotation of the valve.

A further object is, generally, to improve filtering devices of the character described.

Other objects and advantages of the invention will hereinafter appear from a consideration of the following description when taken in conjunction with the drawings, wherein:—

Fig. 1 shows a vertical, central section of the device when it is used with its smaller cap or closure so that the liquid may be directly discharged into a vessel or receptacle for containing it without the use of the cooling or heating coil.

Fig. 2 shows an elevation of the filter shown in section in Fig. 1 in position on an ice cream vending counter in which the coil is placed in the body of ice containing chests or receptacles in which the ice cream is enclosed.

Fig. 3 shows the device, part in elevation and part in section, to which the larger attachable cap enclosing the cooling and heating coil is attached.

In all the views the same reference characters are employed to indicate similar parts.

The filter consists of the cylindrical casing, 5, having preferably a dome-shaped upper closed end at 6, and a neck 7 in which is contained a rotary valve 8 which controls a filling aperture 9, and an air vent aperture thru the pipe 10, when said valve is rotated to closed and open positions. The pipe 10 extends above the top of the inverted dome-shaped portion 11 which serves as a funnel for receiving the liquid to be filtered and to be discharged into the chamber 12 of the cylinder 5.

At the lower end 13 of the cylinder 5 is to be placed a disc of filtering material 14 which covers the opening of the lower end of the cylinder and which is supported upon a perforated or fabricated disc 15. The filtering medium 14 may be carbon, unburned porcelain, paper, or the like. The discs 14 and 15 are supported upon an inverted dome-shaped closure 16, having circumferential flat edges 17 that rest upon the shoulder 18 of the cap or closure 6'. Projecting laterally from the cylinder 5 and the cap 6' are rims 19—19' having slots 20 for the hinged bolts 21 thereby to draw the closure 6' into intimate contact with the lower end of the cylinder 5. There may be as many of the bolts 21 as required spaced circumferentially around the outside of the cylinder and which pass thru the slots in the rims 19—19'.

The lower surface of the dome-shaped structure 16 is provided with a hollow hub 22 into which a tube 23 is inserted, and the outer wall of the cap 6' contains a faucet or tap 23' to which the other end, 24, of the tube 23 is connected. When it is desirable to use the filter in connection with the ice cream vending service the tube 23 is rolled into a coil 25 which may conveniently be located in the lower part of the receptacle 26 which contains ice and the ice cream containers 28 and 29.

The device 5 is secured to the upper end of the container 26 by a suitable elbow or fitting 30. The tube is wound into a coil 25 which is placed in the receptacle 26. The coil 25', of similar character, may be placed in the large cap 6', shown more clearly in Fig. 3, and a cooling or heating fluid may be passed thru and out of the chamber 12' in the cap 6' by the pipes 31 and 32. Any suitable air pump, or source of air supply, such as a rubber bulb 33, or the like, may be employed for compressing air into the chamber 12 of the cylinder 5 above the liquid contained therein or for reversing flow of air or liquid, temporarily, thru the filtering medium 14. The air pump 33, is connected by suitable pipe 34 to the pipe 35, which enters the top of the cylinder 5, at 36, which is controlled by a valve 37. A lateral pipe 38 is connected to the pipe 34 and enters the dome-shaped closure 16, at 39, and this pipe is controlled by a valve 40 so that when this valve is closed the air will pass thru the pipes 34 and 35 into the chamber 12 or when the valve 37 is closed and the valve 40 is open, air under pressure will pass into the chamber surrounded by the dome 16 and thru the filtering medium 14, in the reverse direction, thereby causing the material particles that have been pressed into the pores of the filtering medium to be discharged therefrom.

In using the structure, the cap 6', shown in Fig. 1, may be removed and the cap 6' shown in Fig. 3 may be substituted when desired.

While I have herein shown a single embodiment of my invention for the purpose of clear disclosure, it will be manifest to persons skilled in the art, that many changes may be made in the configuration and disposition of the parts within the scope of the appended claims.

Having described my invention what I claim as new and desire to secure by Letters Patent, is:—

1. A device of the character described comprising an open-ended member having an internal annular shoulder spaced inwardly from the open end and an outwardly extending flange above the shoulder; a cup-shaped partition having an annular rim resting on said shoulder to provide a chamber; a filtering disk resting on said rim; a dome-shaped top member having an open end making telescopic engagement with the first-mentioned member and having a flange around its peripheral surface above the lower edge and bolts passing through said flanges to hold the top and first-mentioned members together and the filter and partition in place between the first-mentioned member and the top member.

2. A device of the character described, comprising an open ended member having an internal annular shoulder spaced inwardly from the open end; a cup-shaped partition having an annular rim resting on said shoulder to provide a chamber; a filtering disk resting on said rim and defining a chamber above said cup; a dome-shaped top member having an open end making telescopic engagement with said first-mentioned member and having its peripheral edge immediately above the shoulder thereof; a tube communicating with the chamber defined by said cup and filter; a tube connected with the interior of said dome-shaped top-member; a valve in each tube; a pump connected to both tubes; and means to hold the members together and the partition and filter in place.

In testimony whereof I hereunto subscribe my name.

HARRY S. LEVINTHAL.